E. FEILHAUER.
LATHE.
APPLICATION FILED SEPT. 22, 1916.
1,250,572.
Patented Dec. 18, 1917.
2 SHEETS—SHEET 1.
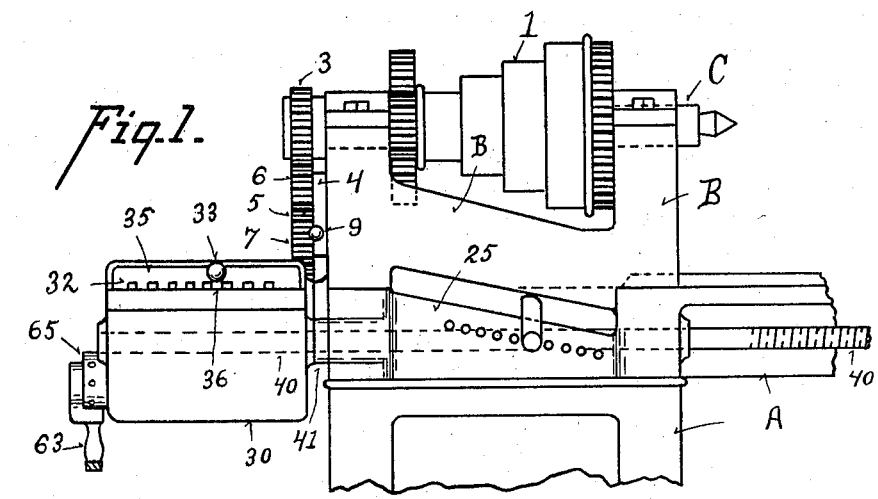
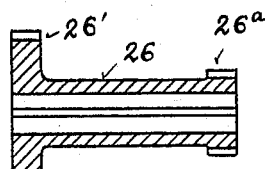
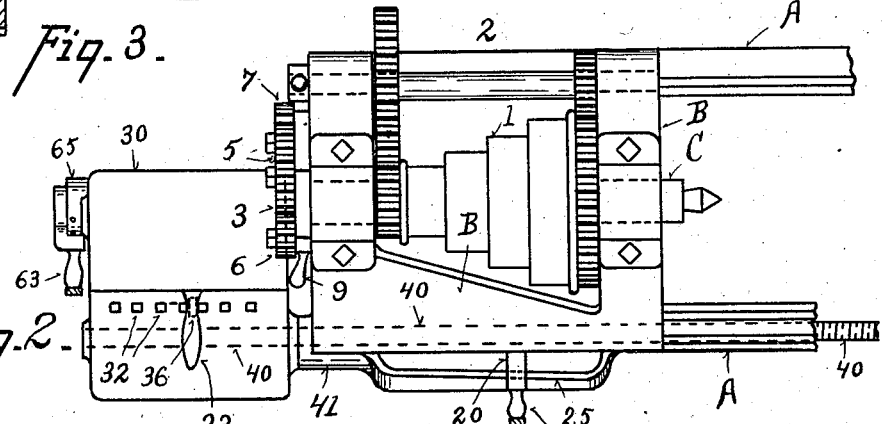
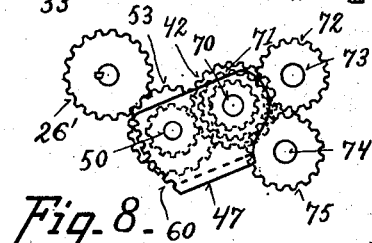
Inventor
Edmund Feilhauer
By C. W. Miles.
Attorney
Witnesses
W. Thornton Bogert
E. S. Lape

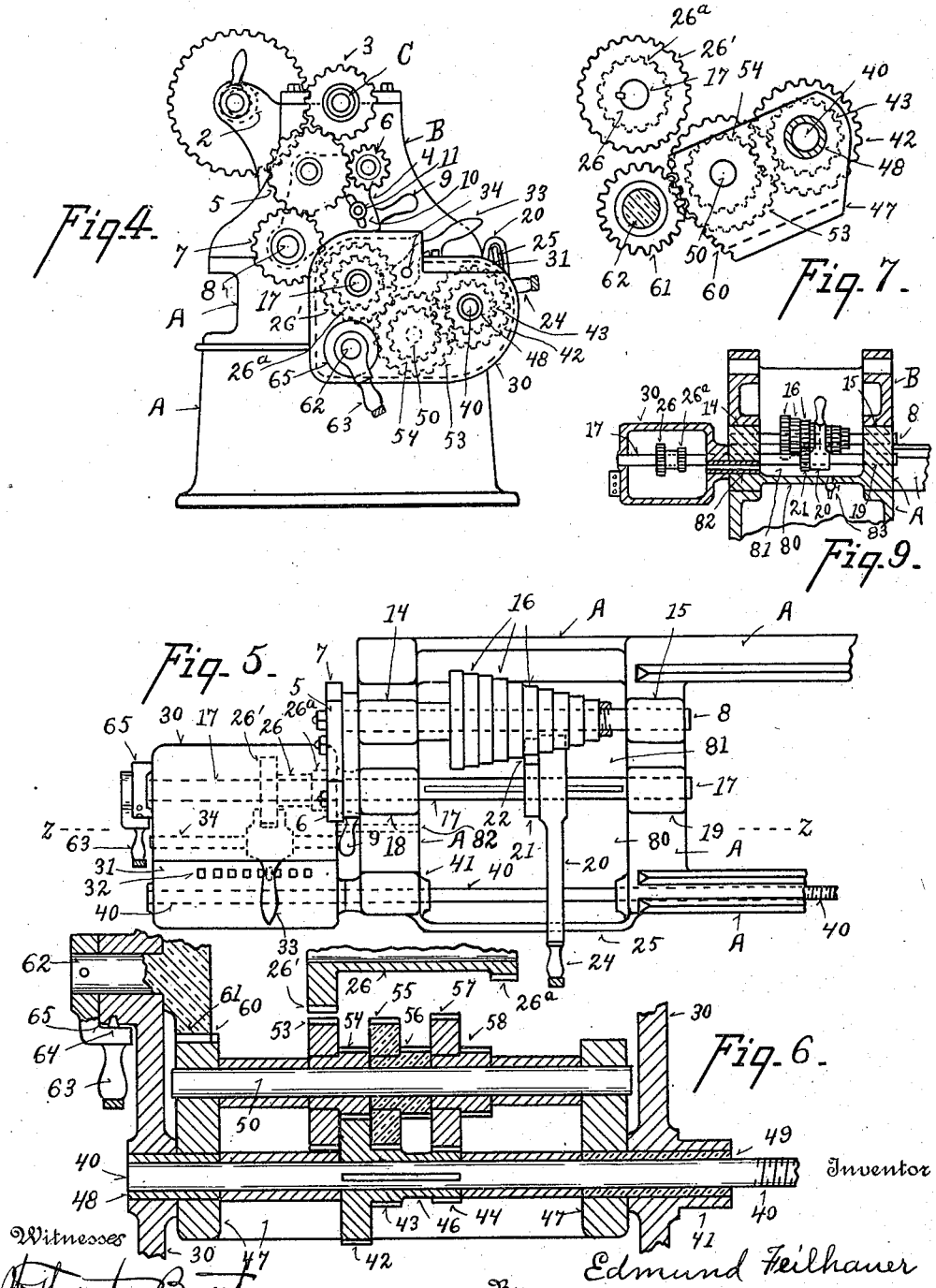

UNITED STATES PATENT OFFICE.

EDMUND FEILHAUER, OF CINCINNATI, OHIO.

LATHE.

1,250,572.  Specification of Letters Patent.  Patented Dec. 18, 1917.

Application filed September 22, 1916. Serial No. 121,672.

*To all whom it may concern:*

Be it known that I, EDMUND FEILHAUER, a citizen of the United States, residing at Cincinnati, in the county of Hamilton and State of Ohio, have invented certain new and useful Improvements in Lathes, of which the following is a specification.

My invention relates to improvements in engine lathes. One of its objects is to provide an improved assembly and arrangement of feed and screw cutting transmission gearing. Another object is to provide improved shifting and speed changing mechanism. Another object is to provide for a simple convenient arrangement and housing of the gearing to secure space for a wide range of feeds and for access thereto and lubrication thereof. My invention also comprises certain details of form, combination and arrangement, all of which will be fully set forth in the description of the accompanying drawings, in which—

Figure 1 is a side elevation of the headstock end of an engine lathe embodying my improvements.

Fig. 2 is a top plan view of the same with the headstock in place.

Fig. 3 is a sectional detail of one of the change gears.

Fig. 4 is an end view of Fig. 2.

Fig. 5 is a top plan view with the headstock removed.

Fig. 6 is a detail partly in section of the speed changing tumbler mechanism.

Fig. 7 is a detail of the tumbler mechanism of Fig. 5 in end elevation.

Fig. 8 illustrates a modification of Fig. 7.

Fig. 9 is a sectional detail on line z z of Fig. 5.

The accompanying drawings represent the preferred embodiment of my invention, in which A represents the lathe ways and main frame, B represents the headstock and C the lathe spindle journaled near opposite ends in the headstock. As illustrated the lathe spindle is to be driven at variable speed from a countershaft by means of a cone pulley 1 on the spindle and the spindle driven directly by the cone pulley or therefrom indirectly at slower speed through a back gear shaft 2 of any approved type. If desired the lathe spindle may be driven by a motor or geared head in the place of a cone pulley.

A gear 3 is rigidly mounted on the lathe spindle and by means of an adjustable tumbler plate 4 is adapted to be engaged with gear 5 or with gear 6 to drive a gear 7 on shaft 8 in either forward or reverse direction. The tumbler plate 4 has a hand lever 9 and a slot 10 and bolt 11 to adjust it about the axis of shaft 8 to adjust either gear 5 or 6 into mesh with gear 3 or to adjust both of them out of engagement with gear 3.

The shaft 8 is journaled in boxes 14 and 15 to the main frame A beneath the headstock where it is protected and out of the way and with space to mount a considerable number of separate gears to form a cone of gears 16 on the shaft 8. A shaft 17 is journaled in boxes 18 and 19 to frame A beneath the headstock and has a tumbler lever 20 mounted loosely thereon and adjustable longitudinally thereof. A gear 21 is journaled to the lever 20 and splined to the shaft 17, and a gear 22 is journaled to lever 20 and in mesh with gear 21. The gear 22 is adjustable by means of lever 20 into engagement with any one of the cone gears 16 to drive the shaft 17 at variable speed from the shaft 8. The handle 24 of lever 20 has a latch pin to engage each of a series of holes in the face of an index plate 25 carried by the frame A to lock the lever 20 in any adjusted position. The end of the shaft 17 projects beyond the frame A and carries a gear sleeve 26 which is splined thereto and adjustable longitudinally thereon.

A gear box or housing 30 is provided with two sleeves which fit into journal boxes 18 and 41 in the main frame A and are secured by set screws or nuts threaded thereon against movement endwise, thereby also securing the gear box 30 firmly in place relative to the frame A. The gear box 30 is preferably made practically oil tight and the gears therein run in oil. The gear box 30 has a detachable lid section 31 having a series of projections 32 which serve as stops to prevent lateral movement of a shifting lever 33 which is loosely journaled on a rod 34 and projects through a slot 35 in the top of the gear box 30. The shifting lever has a forked inner end to engage opposite faces of the gear 26′ to shift said gear to different positions on the shaft 17. When the shifting lever 33 is lifted it is free to move, and when it is depressed a lug 36 thereon engages between two of the projections 32 to lock it in place.

A shaft 40, which may be employed as a feed shaft or lead screw shaft, or jointly, for both purposes, is journaled to the frame A and serves to feed a tool carriage of the usual type, not shown, along the lathe ways. The end of shaft 40 projects through the bearing 41 into the gear box 30, and has rigidly mounted thereon a series of gears of different diameters, which may be varied in number and diameter. I have illustrated three of these gears 42, 43 and 44, all preferably cut or mounted upon a single sleeve 46 rigidly secured to the shaft 40. A tumbler box 47 is loosely journaled upon sleeves 48 and 49 which sleeves serve as bearings for the shaft 40, and may be detached and the shaft 40 removed endwise to detach the tumbler box. A shaft 50 is journaled at 51 and 52 in the tumbler box 47. A pair of gears 53 and 54 are rigidly connected together and loosely journaled on the shaft 50, the gear 54 being in mesh with gear 42. A pair of gears 55 and 56 are rigidly connected together and loosely journaled on shaft 50, with gear 55 in mesh with gear 43. A pair of gears 57 and 58 rigidly connected together are loosely journaled on shaft 50 with gear 57 in mesh with gear 44. The shifting lever 33 enables the gear 26′ to be shifted into position on shaft 17 to mesh with any one of the gears 53 to 58. A gear 26ᵃ also carried by the sleeve 26 can be shifted into engagement with gear 55 or 57, and if desired, also with gear 53 to secure a wide range of speed changes for the shaft 40.

The tumbler box 47 has a segment of a gear 60 cut thereon and a gear or segment of a gear 61 is journaled by means of a stud shaft 62 to the gear box 30. Outside of the gear box 30 is a hand lever 63 rigidly attached to the stud shaft 62 and provided with a latch pin 64 to engage an index plate 65. Thus after the sleeve 26 has been shifted by the lever 33, the lever 63 serves to swing the tumbler box 47 into position to mesh one of the gears on shaft 50 with one of the gears on the sleeve 26.

In Figs. 6 and 7 I have illustrated the gears 42 to 44 and tumbler box 47 as mounted directly on the feed shaft 40. If desired, however, the gears 42 to 44 and tumbler box 47 may be mounted upon an independent short shaft 70 journaled in the feed box 30, as illustrated in Fig. 8, and power transmitted therefrom by means of gears 71 and 72 to a shaft 73 which may serve the purpose of both feed shaft and lead screw, or said shaft 73 may serve only as a lead screw and a separate shaft 74 driven by gear 75, also meshing with gear 71, may serve independently as a feed shaft for the tool carriage.

As illustrated in Fig. 9 that portion of the base A beneath the headstock has a closed bottom 80 which with the adjacent portions of frame A forms an oil container 81 which is placed in communication with the interior of the housing 30 by means of a tube 82. Oil is fed into the housing 30 to any desired height and the oil flows to the same level in the oil container 81, thereby providing a continuous oil supply for the gears 16, 21 and 22 the quadrant 20 and bearings of shafts 8 and 17 and 40. A drain cock 83 enables the oil container 81 to be drained when required.

In the construction and operation of lathes it is desirable once the headstock has been placed in alinement upon the main frame, to avoid removing the same and to be able to detach and replace other parts of the gearing without disturbing the headstock, and, also where necessary to detach and remove the headstock without taking apart or disturbing the transmission gearing. It will be noted that the tumbler or quadrant 4 may be detached from shaft 8 without disturbing any other parts. Also the bearing 15 may be detached and shaft 8 and its gears removed endwise. The shaft 17 may likewise be removed endwise and its tumbler lever and gears removed. Also the lead screw 40 may be removed endwise and the tumbler box 47 and its gears removed, all without disturbing the headstock, and any desired repairs or changes made therein.

It will be noted that the gearing driving the feed shaft or lead screw is all supported upon and carried by the main frame A and gear box 30 which is also attached to the frame A, and hence the headstock may be detached and moved out along the ways without disturbing or requiring disconnection of any of the gearing. The gearing is thus quickly and conveniently accessible and ample space, not otherwise required, is provided therefor.

The mechanism herein illustrated is capable of considerable modification within the scope of the claims without departing from the principle of my invention.

Having described my invention, what I claim is:

1. In a lathe, a main frame, a headstock detachably mounted thereon and provided with a lathe spindle, a cone gear shaft, a tumbler shaft, and a feed shaft located beneath said headstock and journaled to the main frame, gear mechanism carried by the main frame to selectively drive said cone gear tumbler and feed shafts in forward or reverse direction from a gear on the spindle shaft outside the headstock to enable the headstock to be detached and removed without disturbing the relations of said driving mechanism carried by the main frame.

2. In a lathe a main frame a headstock provided with a lathe spindle mounted thereon, a cone gear shaft journaled to the main frame beneath the headstock and provided with a series of gears of different diameters mechanism driven from said lathe spindle to selectively drive said cone gear shaft in forward or reverse direction, a tumbler shaft located parallel to said cone gear shaft and journaled to the main frame below the headstock, a tumbler on said tumbler shaft provided with a gear splined to said tumbler shaft and a gear meshing therewith to engage any one of said cone gears and a gear splined thereto and adjustable longitudinally of said tumbler shaft, a feed shaft, and a tumbler box interposed between said feed shaft and tumbler shaft and provided with a plurality of gears of different diameters adjustable into engagement with the second gear on said tumbler shaft to transmit motion from said tumbler shaft to said feed shaft.

3. In a lathe, a main frame, a headstock detachably mounted upon the main frame and provided with a lathe spindle, a cone gear shaft a tumbler shaft and a tumbler index plate carried by the main frame below said headstock, gear mechanism carried by the main frame to drive said cone gear shaft and tumbler shaft selectively in forward or reverse direction from a gear on the lathe spindle outside of said headstock, a tool carriage feed shaft journaled to the main frame, a gear box connected to the end of the main frame and into which said tumbler shaft and feed shaft project, and gear mechanism located in said gear box to transmit motion at different rates of speed from said tumbler shaft to said feed shaft.

4. In a lathe, a main frame, a headstock detachably mounted thereon and provided with a lathe spindle, a cone gear shaft located beneath the headstock and journaled to the main frame, said shaft being provided with a series of gears, of different diameter, means carried by the main frame to drive said shaft in either direction from a gear on the lathe spindle, a tumbler shaft located beneath the headstock and journaled to the main frame, a gear splined to and longitudinally adjustable upon said tumbler shaft, a tumbler lever to adjust said gear on the tumbler shaft, a gear on said tumbler lever in mesh with the gear on the tumbler shaft to selectively engage said gear on the tumbler shaft with the gears of different diameter on the cone gear shaft, an index plate for said tumbler lever carried by the main frame, a feed shaft and means to drive said feed shaft from said tumbler shaft.

5. In a lathe a main frame a headstock detachably mounted thereon and provided with a lathe spindle, a cone gear shaft a tumbler shaft and a feed shaft located beneath said headstock, and journaled to the main frame, gear mechanism carried by the main frame to drive said cone gear tumbler and feed shafts from a gear on the spindle shaft to permit the headstock to be detached without disturbing the relation of said cone gear, tumbler and feed shafts to each other and to the main frame.

6. In a lathe a main frame a headstock mounted upon the main frame and provided with a lathe spindle, a cone gear shaft a tumbler shaft and a tumbler index plate carried by said main frame beneath said headstock, gear mechanism carried by the main frame to drive said cone gear shaft and tumbler shaft from a gear on the lathe spindle, a tool carriage feed shaft journaled to the main frame, a gear box connected to the end of the main frame and into which said tumbler shaft and feed shaft project, and gear mechanism located in said gear box to transmit motion at different rates of speed from said tumbler shaft to said feed shaft.

7. In a lathe a main frame a headstock detachably mounted upon the main frame and provided with a lathe spindle, a cone gear shaft, a tumbler shaft, a tool carriage feed shaft journaled to the main frame beneath said headstock and operatively connected to drive a tool carriage at different rates of speed, and gear mechanism carried by the main frame to drive said cone gear shaft, tumbler shaft and feed shaft in either direction from a gear on said lathe spindle outside of said headstock to permit said headstock and spindle to be detached without disturbing said gearing carried by the main frame.

8. In a lathe a main frame, a headstock mounted upon the main frame and provided with a lathe spindle, a cone gear shaft a tumbler shaft and a tool carriage feed shaft located beneath said head stock and journaled to said main frame, said shafts being operatively connected to drive a tool carriage at different rates of speed, gear mechanism carried by the main frame to drive said cone gear shaft, tumbler shaft and feed shaft in either direction from a gear on the lathe spindle, and a tumbler index plate carried by said main frame below the headstock.

9. In a lathe a main frame a headstock mounted thereon and provided with a lathe spindle a cone gear shaft, a tumbler shaft and a tool carriage feed shaft journaled to the main frame beneath said headstock with the ends of said tumbler shaft and feed shaft projecting beyond the main frame a gearbox to house the ends of said tumbler shaft and feed shaft, a gear splined to and longitudinally adjustable on said tumbler shaft, a lever to adjust said gear, a tumbler box journaled concentrically with said feed shaft, and provided with a series of speed changing gears to be selectively engaged with the gear on said tumbler shaft, and means to shift said tumbler box to engage and disengage said change gears with said tumbler shaft gear.

10. In a lathe transmission mechanism, a housing forming a container to confine a liquid lubricant therein, a driven shaft therein, a driving shaft therein, a tumbler on one of said shafts and a slip gear on the other of said shafts, a slip gear actuating lever operable from the exterior of said housing, and a tumbler actuating lever operable from the exterior of said housing.

11. In a lathe, a headstock provided with a lathe spindle, transmission mechanism comprising a housing independent of said headstock forming a container to confine a liquid lubricant therein, a driving shaft therein, a driven shaft therein, speed changing mechanism within said housing to transmit motion from one of said shafts to the other, and an actuating lever to effect speed changes within said housing operable from the exterior of said housing.

12. In a lathe, a headstock provided with a spindle, transmission mechanism comprising a cone gear shaft, a tumbler shaft, and feed shaft located independent of the headstock and journaled to the main frame, and an oil container located beneath and independent of said headstock to maintain a body of oil in position to automatically lubricate said transmission shafts and the operative parts carried thereby.

13. In a lathe transmission mechanism, a cone gear shaft a tumbler shaft and feed shaft located beneath the headstock and journaled to the main frame, an oil container to maintain a body of oil in position to automatically lubricate said shafts and operative parts carried thereby, change gear mechanism located outside of the main frame to change the relative speed of said tumbler shaft and feed shaft a change gear housing forming an oil container and housing for said change gear mechanism and an oil conduit leading from one of said oil containers to the other.

14. In a lathe, a headstock provided with a spindle, lathe feed transmission mechanism mounted independent of the headstock upon the main frame, and an oil container to maintain a body of oil in position to automatically lubricate said transmission mechanism, carried by the main frame below and independent of the headstock.

In testimony whereof I have affixed my signature in the presence of two witnesses.

EDMUND FEILHAUER.

Witnesses:
C. W. MILES,
W. THORNTON BOGERT.

Copies of this patent may be obtained for five cents each, by addressing the "Commissioner of Patents, Washington, D. C."